(12) United States Patent
Chien

(10) Patent No.: US 9,998,884 B2
(45) Date of Patent: Jun. 12, 2018

(54) METHOD FOR PREVENTING MISDIRECTION OF PICTURES AND ELECTRONIC DEVICE USING THE SAME

(71) Applicant: Chiun Mai Communication Systems, Inc., New Taipei (TW)

(72) Inventor: How-Wen Chien, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days. days.

(21) Appl. No.: 15/498,480

(22) Filed: Apr. 27, 2017

(65) Prior Publication Data
US 2017/0318438 A1 Nov. 2, 2017

(30) Foreign Application Priority Data

Apr. 29, 2016 (CN) .......................... 2016 1 0284851

(51) Int. Cl.
| | |
|---|---|
| *H04M 1/725* | (2006.01) |
| *H04W 4/12* | (2009.01) |
| *H04W 12/02* | (2009.01) |
| *H04W 68/00* | (2009.01) |
| *G06K 9/00* | (2006.01) |
| *H04L 29/08* | (2006.01) |

(52) U.S. Cl.
CPC ............. *H04W 4/12* (2013.01); *H04W 12/02* (2013.01); *H04W 68/005* (2013.01); *G06K 9/00288* (2013.01); *H04L 67/306* (2013.01)

(58) Field of Classification Search
CPC ..... H04W 4/12; H04W 12/02; H04W 68/005; G06K 9/00288; H04L 67/306

USPC ....................................................... 455/412.2
See application file for complete search history.

(56) References Cited

U.S. PATENT DOCUMENTS

| | | | | |
|---|---|---|---|---|
| 6,111,917 A * | 8/2000 | Tomita | ................. | H04N 21/643 |
| | | | | 375/240.27 |
| 7,102,670 B2 * | 9/2006 | Seaman | ................. | H04N 5/772 |
| | | | | 348/231.2 |
| 9,002,057 B2 * | 4/2015 | Outtagarts | ............... | G06T 7/292 |
| | | | | 348/139 |
| 9,344,485 B2 * | 5/2016 | Smadi | ..................... | H04L 67/06 |
| 9,479,687 B2 * | 10/2016 | Chien | ................ | H04N 5/23206 |
| 9,480,076 B2 * | 10/2016 | Jung | .................. | H04W 72/121 |
| 9,830,290 B2 * | 11/2017 | Chien | ................... | H04W 4/008 |
| 2014/0055553 A1 * | 2/2014 | Lee | .................... | G06K 9/00288 |
| | | | | 348/14.07 |
| 2014/0280605 A1 * | 9/2014 | Zhang | ................. | H04L 67/1095 |
| | | | | 709/205 |
| 2016/0048298 A1 * | 2/2016 | Choi | ................... | G06F 3/04842 |
| | | | | 715/846 |

(Continued)

*Primary Examiner* — Marceau Milord
(74) *Attorney, Agent, or Firm* — ScienBiziP, P.C.

(57) ABSTRACT

A method for preventing misdirection of pictures and non-authorized viewing which can be applied on a sending terminal communicating with receiving terminals is provided. The method comprises determining a target picture and user identity information of one or more receiving terminals as recipients. The target picture is identified through an image recognition system as being private or non-private and a determination is made as to whether the one or more receiving terminals can receive the target picture. The target picture is sent to the one or more receiving terminals when determining that all the users of the one or more receiving terminals can receive the target picture.

16 Claims, 5 Drawing Sheets

(56) References Cited

U.S. PATENT DOCUMENTS

2016/0294894 A1* 10/2016 Miller .................... H04L 51/32
2016/0381111 A1* 12/2016 Barnett ................ H04L 65/601
　　　　　　　　　　　　　　　　　　　　　　　　709/231
2017/0091532 A1* 3/2017 Son .................... G06K 9/00268

* cited by examiner

METHOD FOR PREVENTING MISDIRECTION OF PICTURES AND ELECTRONIC DEVICE USING THE SAME

CROSS-REFERENCE TO RELATED APPLICATIONS

This application claims priority to Chinese Patent Application No. 201610284851.2 filed on Apr. 29, 2016, the contents of which are incorporated by reference herein.

FIELD

The subject matter herein generally relates to data transmission field, especially relates to a method for preventing pictures going astray and unauthorized viewing of pictures and an electronic device using the same.

BACKGROUND

When sending pictures by an electronic device, the pictures can be misdirected or opened in a non-private environment.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
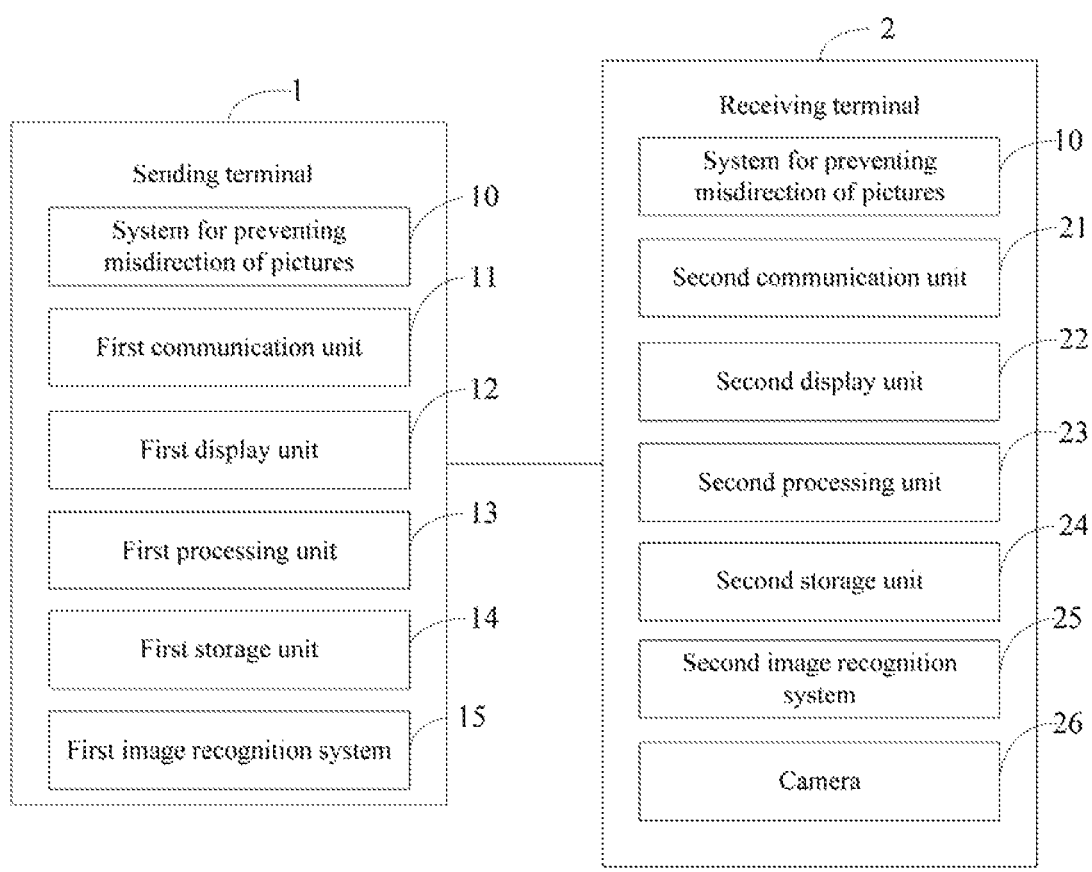
FIG. 1 is a block diagram of an embodiment of a running environment of a system for preventing misdirection of pictures.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" indicates "including, but not necessarily limited to"; it specifically indicates open-ended inclusion or membership in a so-described combination, group, series, and the like.

FIG. 1 illustrates an embodiment of a running environment of a system 10 for preventing misdirection of pictures. The system 10 is installed in a sending terminal 1 and at least one receiving terminal 2. In the sending terminal 1, the system 10 is used to determine whether the receiving terminal 2 is capable of receiving a picture sent by the sending terminal 1 and also determining whether the picture is a private picture. A user of the sending terminal 1 can thus be warned or reminded to resend the picture when the receiving terminal 2 fails to receive the picture, and to remind the user of the sending terminal 1 whether to send the picture when the sending terminal 1 is not capable of identifying whether the picture is a private picture. In the receiving terminal 2, when receiving the picture sent by the sending terminal 1, the system 10 is used to determine whether the received picture is a private picture, and determine whether the receiving terminal 2 is in a private environment for viewing purposes. The picture can be displayed on the receiving terminal 2 when the receiving terminal 2 is in the private environment.

The sending terminal 1 includes a first communication unit 11. The receiving terminal 2 includes a second communication unit 21. The sending terminal 1 communicates with the receiving terminal 2 via the first communication unit 11 and the second communication unit 21. In at least one embodiment, the first communication unit 11 and the second communication unit 21 can be a wireless network card, a GPRS (General Packet Radio Service) module, or other wireless communication device. In another embodiment, the first communication unit 11 and the second communication unit 21 also can be data line or other wired communication device. In at least one embodiment, the first communication unit 11 connects to the second communication unit 21 via a wireless network, and thus the sending terminal 1 can connect to the receiving terminal 2.

The sending terminal 1 includes, but is not limited to, a first display unit 12, a first processing unit 13, a first storage unit 14, and a first image recognition system 15. The receiving terminal 2 includes, but is not limited to, a second display unit 22, a second processing unit 23, a second storage unit 24, a second image recognition system 25, and a camera 26. The first display unit 12 and the second display unit 22 are used to display pictures. In at least one embodiment, the first display unit 12 and the second display unit 22 can be touch screen, which receives touch input and displays pictures. In another embodiment, the first display unit 12 and the second display unit 22 can only display pictures, the sending terminal 1 and the receiving terminal 2 each further include input unit (not shown) to receive input operation. For example, the input unit can be keyboard or mouse.

The first processing unit 13 is used to execute program instructions installed in the sending terminal 1 and control the sending terminal 1 to execute corresponding actions. The second processing unit 23 is used to execute program instructions installed in the receiving terminal 2 and control the receiving terminal 2 to execute corresponding actions. The first processing unit 13 and the second processing unit 23 can be central processing unit (CPU)s, microprocessors, or other data processor chips. The first storage unit 14 is used to store the program instructions installed in the sending terminal 1 and data, the second storage unit 24 is used to store the program instructions installed in the receiving terminal 2 and data. For example, the first storage unit 14 and the second storage unit 24 can be an internal storage system, such as a flash memory, a random access memory (RAM) for temporary storage of information, and/or a read-only memory (ROM) for permanent storage of information. The first storage unit 14 and the second storage unit 24 can also be an external storage system, such as a hard disk, a storage card, or a data storage medium.

The first image recognition system 15 and the second image recognition system 25 are used to recognize the picture. For example, the first image recognition system 15 and the second image recognition system 25 are used to recognize face included in the picture, compare the recognized face with a preset face, and recognize specific information. In at least one embodiment, the specific information includes at least one of account information, password information, identity information, and private picture. The camera 26 is used to capture pictures. In at least one embodiment, the sending terminal 1 can be a smart phone, a tablet computer, a notebook, or other suitable communication device. The receiving terminal 2 can be a smart phone, a tablet computer, a notebook, a display device, or a photographic device.

Figure 2:
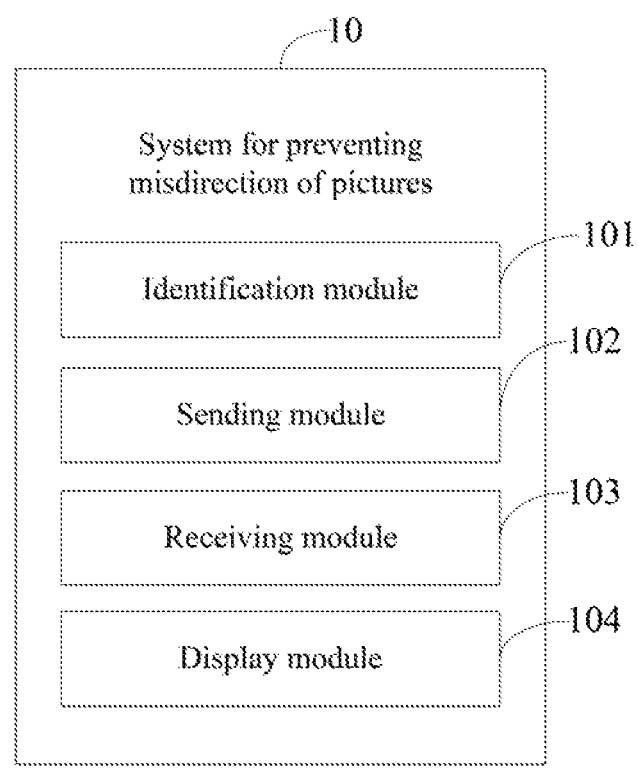
FIG. 2 is a block diagram of an embodiment of the system of FIG. 1.

FIG. 2 illustrates an embodiment of the system 10 for preventing picture misdirection. In at least one embodiment, the system 10 can include an identification module 101, a sending module 102, a receiving module 103, and a display module 104. In one embodiment, the identification module 101 and the sending module 102 are run in the sending terminal 1, the receiving module 103 and the display module 104 are run in the receiving terminal 2. In other embodiment, the identification module 101, the sending module 102, the receiving module 103 and the display module 104 are run in the sending terminal 1 and receiving terminal 2 respectively.

Figure 3:
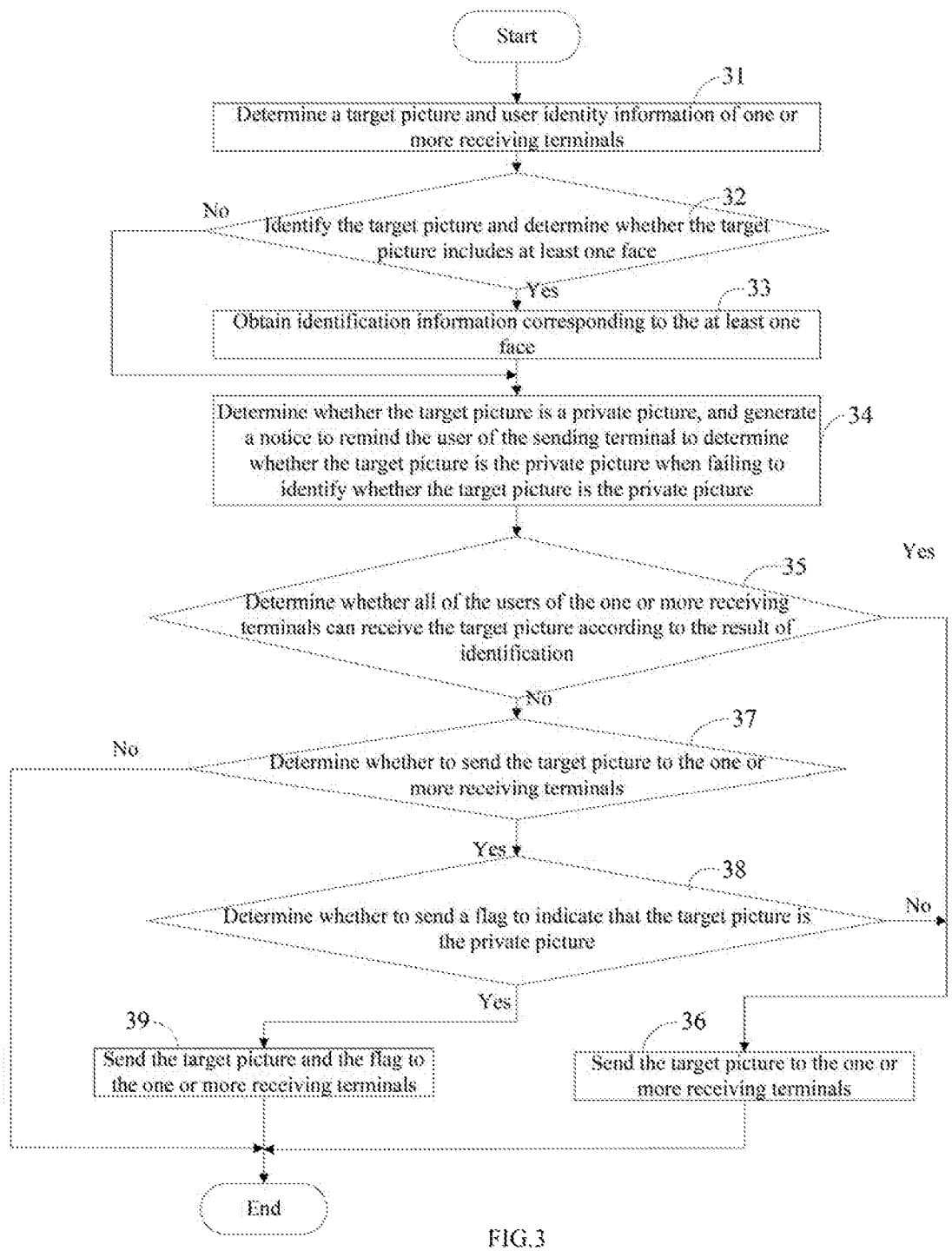
FIG. 3 is a flowchart of an embodiment of method for preventing misdirection of pictures.

FIG. 3 illustrates a flowchart of method for preventing misdirection of pictures. The method 30 is provided by way of example, as there are a variety of ways to carry out the method. Each block shown in FIG. 3 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 31.

At block 31, the identification module 101 determines a target picture and user identity information of one or more receiving terminals 2. In at least one embodiment, the identification module 101 determines a target picture stored in the first storage unit 14 and user identity information of the one or more receiving terminals 2 in response to operation from the sending terminal 1. In at least one embodiment, the first storage unit 14 of the sending terminal 1 stores an address book. The address book includes identity information of the user of the receiving terminal 2, head portrait of the user of the receiving terminal 2, and authority of the user of the receiving terminal 2 to view pictures. In the embodiment, the authority of the user of the receiving terminal 2 is based on lists of persons who are permitted to view by the user of the receiving terminal 12. Persons who are forbidden to view by the user of the receiving terminal 12 are also listed. In another embodiment, the address book includes identity information and head portrait of the user of the receiving terminal 2. The authority of the user of the receiving terminal 2 to view pictures is stored in a first server communicating with the sending terminal 1. The identification module 101 determines whether the user of the receiving terminal 12 has the authority to view pictures according to the first server communicating with the sending terminal 1. In other embodiments, an address book which includes identity information of the user of the sending terminal 1, identity information, and head portrait of the user of the receiving terminal 2 together with the authority of the user of the receiving terminal 2 to view pictures, is stored in a second server.

A table T1 further explains the authority of the user of the receiving terminal 2 to view pictures. Table T1 includes a column of user, a column of having the right to view the picture, and a column of having no right to view the picture. The column of user is configured to record users of the receiving terminals 2, the column of having the right to view the picture is configured to record persons who are permitted to view by the user recorded in the column of user. The column of having no right to view the picture records persons who are forbidden to view by the user recorded in the column of user. For example, in the embodiment, as listed in table T1, user a1, user a2, user a3, user b1, user b2, user b3 and user b4, user b5, user b6, and user b7 are different users. When user a1 has a friendship with user b1, user b4, and user b5, the user a1 has the right to view pictures of user b1, user b4, and user b5. When user a1 has a hostile relationship with the user b2 and user b6, the user a1 has no right to view picture of user b2 and user b6. Similarly, when user a2 has a friendship with user b1, user b2, and user b6, the user a2 has the right to view pictures of user b1, user b2, and user b6. When user a2 has a hostile relationship with the user b4 and user b7, the user a2 has no right to view pictures of user b2, user b6, user b4, and user b7.

TABLE T1

| User | Having the right to view the picture | having no right to view the picture |
|---|---|---|
| User a1 | User b1, User b4, User b5 | User b2, User b6 |
| User a2 | User b1, User b2, User b6 | User b4, User b7 |
| User a3 | User b3, User b4, User b7 | User b5, User b6 |

At block 32, the identification module 101 further identifies the target picture and determines whether the target picture includes at least one face, through the first image recognition system 15. When the target picture includes at least one face, the method executes block 33; when the target picture does not include any faces, the method executes block 34.

At block 33, the identification module 101 obtains identification information corresponding to the at least one face. In at least one embodiment, the identification module 101 identifies the at least one face to determine identification information corresponding to the at least one face through comparing the at least one face in the target picture with the head portraits stored in the address book.

At block 34, the identification module 101 determines whether the target picture is a private picture, and generates a notice to remind the user of the sending terminal 1 to determine whether the target picture is the private picture when the identification module 101 is not capable of identifying whether the target picture is the private picture.

In at least one embodiment, the identification module 101 determines whether the target picture includes specific information, and determines that the target picture is the private picture when the target picture includes specific information. The specific information may include for example, account information, password information, identification information, and the like. When the target picture does not include the specific information, the identification module 101 is not capable of identifying whether the target picture is a picture, and generates the notice according in a preset way. For example, the preset way can be displaying a prompt window to prompt the user of the sending terminal 1 to make own determination as to whether the target picture is a picture. The prompt window is further configured to receive confirmation input by the user of the sending terminal 1.

At block 35, the sending module 102 determines whether all of the users of the one or more receiving terminals 2 can receive the target picture according to the result of identification by the identification module 101. When determining that all of the users of the one or more receiving terminals 2 can receive the target picture, the method executes block 36, otherwise, the method executes block 37.

Figure 4:
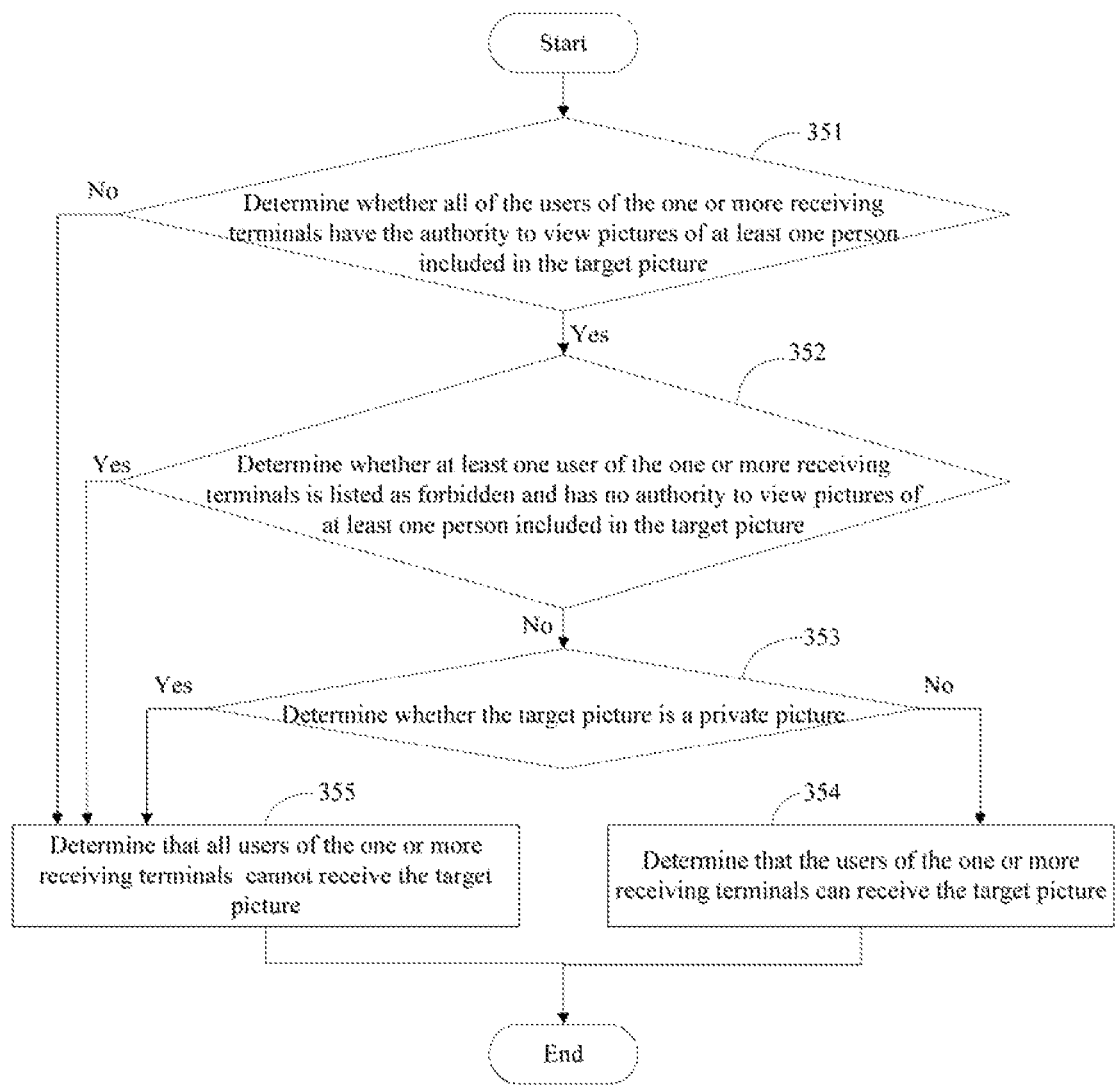
FIG. 4 is a flowchart of an embodiment of block 35 of FIG. 3 to determine whether the one or more receiving terminals is capable of receiving a target picture

FIG. 4 illustrates an embodiment of a flowchart of block 35 of FIG. 3 to determine whether the one or more receiving terminals 2 is capable of receiving the target picture in a method 350.

At block 351, the sending module 102 determines whether all of the users of the one or more receiving terminals 2 have the authority to view pictures of at least one person included in the target picture through the address book. In at least one embodiment, when all of the users of the one or more receiving terminals 2 have the authority to view pictures of at least one person included in the target picture, the method 350 executes block 352. When at least one user of the one or more receiving terminals 2 has no authority to view pictures of at least one person included in the target picture, the method 350 execute block 355. In another embodiment, when the sending module 102 determines that all of the users of the one or more receiving terminals 2 have the authority to view pictures of at least one person included in the target picture, the method 350 executes block 354. In other embodiment, the block 351 can be omitted.

At block 352, the sending module 102 determines whether at least one user of the one or more receiving terminals 2 is listed as forbidden and has no authority to view pictures of at least one person included in the target picture through the address book. When no user of the one or more receiving terminals 2 has no authority to view pictures of at least one person included in the target picture, the method executes block 353. When at least one user of the one or more receiving terminals 2 has no authority to view pictures of at least one person included in the target picture, the method executes block 355. In another embodiment, when no user of the one or more receiving terminals 2 has no authority to view pictures of at least one person included in the target picture, the method directly executes block 354. In another embodiment, the block 352 can be omitted.

At block 353, the sending module 102 determines whether the target picture is the private picture. When the target picture is not the private picture, the method executes block 354; otherwise, the method 350 executes the block 355.

At block 354, the sending module 102 determines that the users of the one or more receiving terminals 2 can receive the target picture. Then the method 350 ends.

At block 355, the sending module 102 determines that all users of the one or more receiving terminals 2 cannot receive the target picture. Then the method 350 ends.

Referring to table T1, when the user of the sending terminal 1 sends the target picture including persons of user b1, user b2, and user b3 to the user a1, user a2, and user a3 of the receiving terminals 2, although users a1, a2, and a3 have the authority to view pictures of at least one person included in the target picture (namely user a1 have the right to view pictures including user b1; user a2 have the right to view pictures including user b1 and user b2; user a3 have the right to view pictures including user b3), user a1 have no authority to view pictures of at least one person included in the target picture (namely user a1 has no right to view pictures including user b2), accordingly, the sending module 102 determines that not all of the user b1, user b2, and user b3 can receive the target picture including user b1, user b2, and user b3.

When the user of the sending terminal 1 sends target pictures including persons of users b1, b2, and user b3 to the users a2 and a3 of the receiving terminals 2, users a2 and a3 have the authority to view pictures of at least one person including in the target picture (namely user a2 have the right to view pictures including user b1 and user b2; user a3 have the right to view pictures including user b3), and none of the users b2 and b3 have no authority to view pictures of at least one person included in the target picture (namely, none of users b2 and b3 have no right to view pictures including user b1, user b2, user b3). The sending module 102 determines that both user b2 and user b3 can receive the target picture including user b1, user b2, and user b3

At block 36, the sending module 102 sends the target picture to the one or more receiving terminals 2 when determining that the users of the one or more receiving terminals 2 can receive the target picture.

At block 37, the sending module 102 determines whether to send the target picture to the one or more receiving terminals 2 when determining that not all the users of the one or more receiving terminals 2 can receive the target picture. When determining to send the target picture to the one or more receiving terminals 2, the method 30 executes block 38, otherwise, the method 30 ends. In at least one embodiment, the sending module 102 generates a notice in a preset way to remind the user of the sending terminal 1 to determine whether to send the target picture when determining that not all the users of the one or more receiving terminals 2 can receive the target picture. For example, the preset way can be displaying a prompt window to prompt the user of the sending terminal 1 to determine whether to send the target picture to the one or more receiving terminals 2.

At block 38, when the target picture is the private picture, the sending module 102 determines whether to send a flag to indicate that the target picture is the private picture. When determining to send the flag, the method 30 executes block 39, when determining not to send the flag, the method 30 executes the block 36. In at least one embodiment, the flag can be a piece of data in a preset format. In at least one embodiment, the sending module 102 reminds the user of the sending terminal 1 to determine whether to send the flag in a preset way. For example, the sending module 102 can provides a prompt window to remind the user of the sending terminal 1 to determine whether to send the flag or not.

At block 39, the sending module 102 sends the target picture and the flag to the one or more receiving terminals 2.

Figure 5:
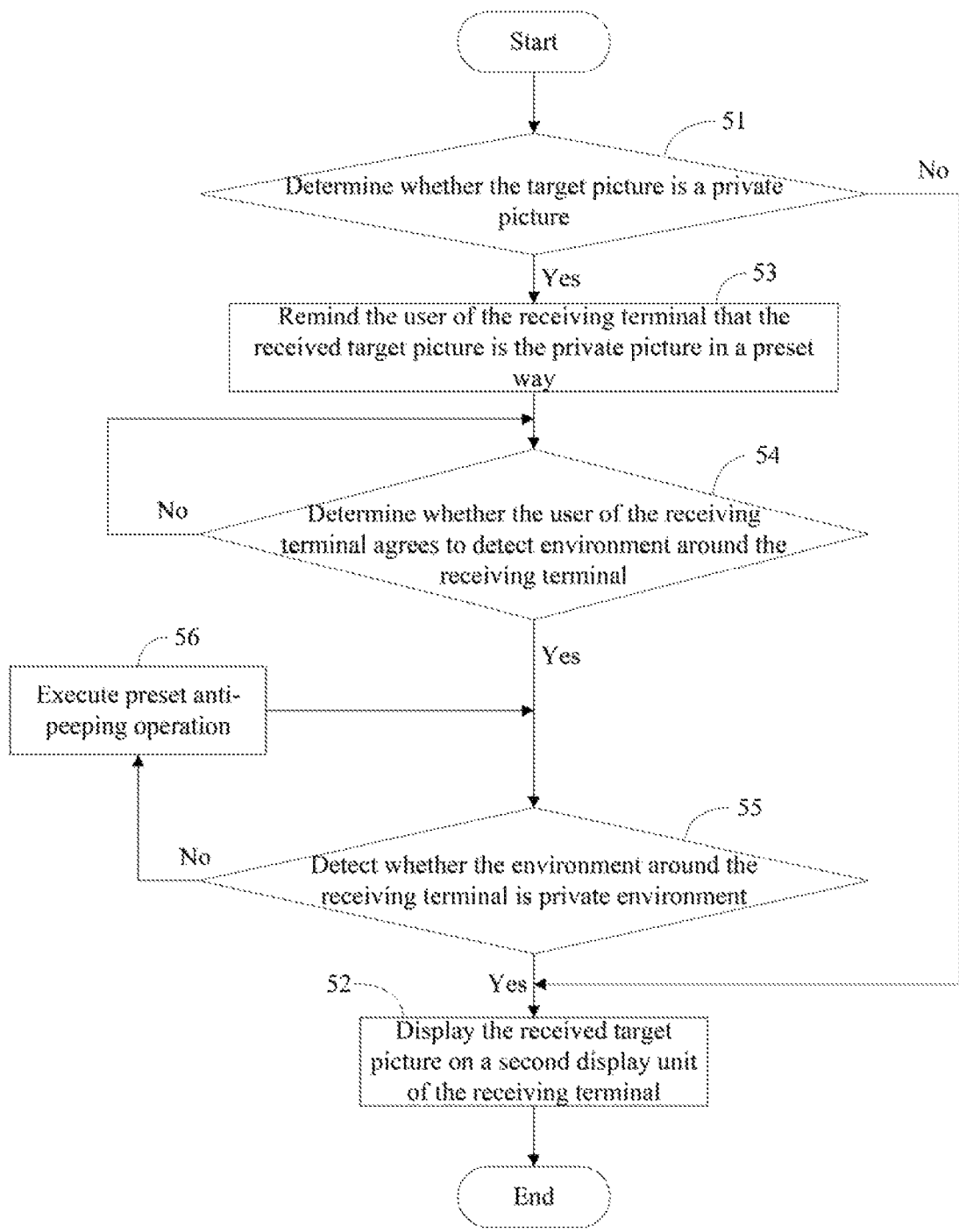
FIG. 5 is a flowchart of an embodiment of method for receiving the picture.

FIG. 5 illustrates a flowchart of an embodiment of method 50 for receiving the target picture. The method 50 is provided by way of example, as there are a variety of ways to carry out the method. Each block shown in FIG. 5 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 51.

At block 51, the receiving module 103 determines whether the target picture is the private picture when receiving the target picture from the sending terminal 1. When determining that the received target picture is not a private picture, the method 50 executes block 52, otherwise, the method 50 executes block 53. The receiving module 103 determines whether the flag is received to determine whether the received target picture is the private picture. When the flag is received, the receiving module 103 determines that the received target picture is the private picture, and when no flag is received, the receiving module 103 determines that the received target picture is not a private picture.

At block 52, the display module 104 displays the received target picture on the second display unit 22 of the receiving terminal 2.

At block 53, the display module 104 reminds the user of the receiving terminal 2 that the received target picture is the private picture in a preset way. For example, the preset way can be displaying a window to notify the user of the receiving terminal 2 that the received target picture is the private picture. In at least one embodiment, the block 53 can be omitted.

At block 54, the display module 104 determines whether the user of the receiving terminal 1 agrees to detect environment around the receiving terminal 2. When determining that the user of the receiving terminal 2 agrees to detect environment around the receiving terminal 2, the method 50 executes block 55, otherwise, the method 50 goes back to block 54. In at least one embodiment, the block 55 can be omitted.

At block 55, the display module 104 detects whether the environment around the receiving terminal 2 is private environment. When the environment around the receiving terminal 2 is private environment, the method 50 executes block 52, otherwise, the method 50 executes block 56.

In at least one embodiment, the displaying module 104 acquire image around the receiving terminal 2 from the camera 26, and determines whether the environment around the receiving terminal 2 is private environment through the second image recognition system 25 identifying the image from the camera 26. In at least one embodiment, the displaying module 104 can determine number of human eyes through the second image recognition system 25, and determines the environment around the receiving terminal 2 is private environment according to the number of human eyes. For example, when the number of human eyes is two, namely, only the user of receiving terminal 2 is around the receiving terminal 2, the displaying module 104 can determine the environment around the receiving terminal 2 is private environment. When the number of human eyes is more than two, the displaying module 104 determines the environment around the receiving terminal 2 is not private environment.

In another embodiment, the displaying module 104 can determine number of human faces through the second image recognition system 25, and determines the environment around the receiving terminal 2 is private environment according to the number of human eyes. For example, when the number of human faces is one, namely, only the user of receiving terminal 2 is around the receiving terminal 2, the displaying module 104 can determine the environment around the receiving terminal 2 is private environment. When the number of human faces is more than two, the displaying module 104 determines the environment around the receiving terminal 2 is not private environment.

In other embodiments, when the display module 104 determines the number of human faces is one, the display module 104 further compares the human face in the image from the camera 26 with a preset face image stored in the second storage unit 24, and determine the environment around the receiving terminal 2 is private environment when the human face in the image from the camera 26 is consistent with the preset face image stored in the second storage unit 24.

At block 56, the display module 104 executes preset anti-peeping operation. For example, the preset anti-peeping operation can be closing the second display unit 22, hiding the target picture, or outputting a notification that the environment around the receiving terminal is not a private environment. In at least one embodiment, after executing block 56, the method 50 ends. In another embodiment, after executing block 56, the method 50 goes back to block 55.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A method for preventing misdirection of pictures, applied on a sending terminal communicated with at least one receiving terminal, the method comprising:

determining a target picture and user identity information of one or more receiving terminals;

identifying the target picture through an image recognition system;

determining whether all users of the one or more receiving terminals can receive the target picture according to result of the identification; and sending the target picture to the one or more receiving terminals when determining that all the users of the one or more receiving terminals can receive the target picture, wherein the method further comprises:

determining whether all the users of the one or more receiving terminals have authority to view pictures of at least one person in the target picture;

determining whether at least one user of the one or more receiving terminals has no authority to view pictures of at least one person in the target picture; and determining that all the users of the one or more receiving terminals can receive the target picture when all the users of the one or more receiving terminals have authority to view pictures of at least one person in the target picture and no user of the one or more receiving terminals has no authority to view pictures of at least one person in the target picture.

2. The method according to the claim 1, further comprising:
determining whether to send the target picture to the one or more receiving terminals when determining that not all the users of the one or more receiving terminals can receive the target picture; and
sending the target picture to the one or more receiving terminals when determining sending the target picture to the one or more receiving terminals.

3. The method according to claim 2, further comprising:
generating a first notice in a preset way to remind the user of the sending terminal to determine whether to send the target picture when determining that not all the users of the one or more receiving terminals can receive the target picture.

4. The method according to claim 2, the method further comprising:
determining whether the target picture comprises at least one face; and
identifying the at least one face.

5. The method according to claim 1, the method further comprising:
determining whether the target picture is a private picture;
determining that all the users of the one or more receiving terminals cannot receive the target picture when the target picture is the private picture; or
determining that all the users of the one or more receiving terminals can receive the target picture when the target picture is not the private picture.

6. The method according to claim 5, the method further comprising:
determining whether the target picture comprises specific information, and determining the target picture is a private picture when the target picture comprises the specific information, wherein the specific information includes at least one of account information, password information, identity information and private picture.

7. The method according to claim 6, the method further comprising:
generating a second notice to remind the user of the sending terminal to determine whether the target picture is a private picture when the target picture does not comprise the specific information; and
receiving confirmation input by the user of the sending terminal.

8. The method according to claim 7, the method further comprising:
determining whether to send a flag to indicate that the target picture is a private picture when the target picture is the private picture.

9. A sending terminal, communicated with one or more receiving terminals, the sending terminal comprising:
at least one processing unit; and
a non-transitory storage medium coupled to the at least one processing unit and configured to store a plurality of instructions, which cause the sending terminal to:
determine a target picture and user identity information of one or more receiving terminals;
identify the target picture through an image recognition system;
determine whether all users of the one or more receiving terminals can receive the target picture according to result of the identification; and
send the target picture to the one or more receiving terminals when determining that all the users of the one or more receiving terminals can receive the target picture, wherein the plurality of instructions further cause the sending terminal to:
determine whether all the users of the one or more receiving terminals have authority to view pictures of at least one person in the target picture;
determine whether at least one user of the one or more receiving terminals has no authority to view pictures of at least one person in the target picture; and
determine that all the users of the one or more receiving terminals can receive the target picture when all the users of the one or more receiving terminals have authority to view pictures of at least one person in the target picture and no user of the one or more receiving terminals has no authority to view pictures of at least one person in the target picture.

10. The sending terminal according to claim 9, wherein the plurality of instructions is further configured to cause the sending terminal to:
determine whether to send the target picture to the one or more receiving terminals when determining that not all the users of the one or more receiving terminals can receive the target picture; and
send the target picture to the one or more receiving terminals when determining sending the target picture to the one or more receiving terminals.

11. The sending terminal according to claim 10, wherein the plurality of instructions is further configured to cause the sending terminal to:
generate a first notice in a preset way to remind the user of the sending terminal to determine whether to send the target picture when determining that not all the users of the one or more receiving terminals can receive the target picture.

12. The sending terminal according to claim 10, wherein the plurality of instructions is further configured to cause the sending terminal to:
determine whether the target picture comprises at least one face; and
identify the at least one face.

13. The sending terminal according to claim 11, wherein the plurality of instructions is further configured to cause the sending terminal to:
determine whether the target picture is a private picture;
determine that all the users of the one or more receiving terminals cannot receive the target picture when the target picture is the private picture; or
determine that all the users of the one or more receiving terminals can receive the target picture when the target picture is not the private picture.

14. The sending terminal according to claim 13, wherein the plurality of instructions is further configured to cause the sending terminal to:
determine whether the target picture comprises specific information, and determine the target picture is a private picture when the target picture comprises the specific information, wherein the specific information includes at least one of account information, password information, identity information and private picture.

15. The sending terminal according to claim 14, wherein the plurality of instructions is further configured to cause the sending terminal to:
   generate a second notice to remind the user of the sending terminal to determine whether the target picture is a private picture when the target picture does not comprise the specific information; and
   receive confirmation input by the user of the sending terminal.

16. The sending terminal according to claim 15, wherein the plurality of instructions is further configured to cause the sending terminal to:
   determine whether to send a flag to indicate that the target picture is a private picture when the target picture is the private picture.

* * * * *